United States Patent [19]

Pauze

[11] 4,404,331

[45] Sep. 13, 1983

[54] ENAMEL HAVING IMPROVED COATABILITY AND INSULATED ELECTRICAL ARTICLES PRODUCED THEREFROM

[75] Inventor: Denis R. Pauze, Scotia, N.Y.

[73] Assignee: General Electric Company, Schenectady, N.Y.

[21] Appl. No.: 380,589

[22] Filed: May 21, 1982

Related U.S. Application Data

[63] Continuation of Ser. No. 183,857, Sep. 3, 1980, abandoned.

[51] Int. Cl.³ .............................................. C08L 77/00
[52] U.S. Cl. .............................. 525/424; 174/110 N; 174/110 SR; 427/120; 428/379; 524/210; 524/352; 524/361; 524/381; 524/398
[58] Field of Search .............. 525/424; 524/210, 381, 524/352, 361; 523/206

[56] References Cited

U.S. PATENT DOCUMENTS

| | | | |
|---|---|---|---|
| 2,936,296 | 5/1960 | Precodio et al. | 260/33.4 |
| 3,190,770 | 6/1965 | Lavin et al. | 525/424 |
| 3,342,780 | 9/1967 | Meyer et al. | 260/33.4 R |
| 3,382,203 | 5/1968 | Rating et al. | 260/33.4 R |
| 3,415,903 | 12/1968 | Bottger | 525/424 |
| 3,426,098 | 2/1969 | Meyer et al. | 524/424 |
| 3,541,038 | 11/1970 | Nakano et al. | 260/30.6 |
| 3,551,278 | 12/1970 | Ogata et al. | 525/434 |
| 3,562,219 | 2/1971 | Schmidt et al. | 260/33.4 R |
| 3,620,996 | 11/1971 | Matsumura et al. | 260/33.4 R |
| 3,668,175 | 6/1972 | Sattler | 260/33.4 R |
| 3,697,471 | 10/1972 | Schmidt et al. | 260/33.4 R |
| 3,732,186 | 5/1973 | Dunwald et al. | 524/424 |
| 3,847,867 | 11/1974 | Heath | 260/33.8 R |
| 3,953,649 | 4/1976 | Suzuki et al. | 525/425 |
| 4,024,010 | 5/1977 | Boccia | 428/83 |
| 4,098,800 | 7/1978 | Banucci et al. | 260/346.3 |
| 4,104,221 | 8/1978 | Janssen et al. | 525/434 |
| 4,115,341 | 9/1978 | Boldebuck et al. | 260/33.2 R |
| 4,119,605 | 10/1978 | Keating | 260/33.2 R |
| 4,228,059 | 10/1980 | Ohn | 260/33.2 R |

FOREIGN PATENT DOCUMENTS 1062395 9/1979 Canada .
973377 10/1964 United Kingdom .
1350993 4/1974 United Kingdom .

OTHER PUBLICATIONS

Derwent Abs., 11723 x/07, Hitachi, (2/11/76).
Derwent Abs., 06051 x/04, Showa, (5/9/75).
Derwent Abs., 82087 y/46, Showa, (10/7/77).
Derwent Abs., 90519 b/50, Hitachi, J79038296, (11/20/79).
Derwent Abs., 55036 B/30, Furukana, (3/13/79).
Derwent Abs., 15738 Y/09, Daiichi Danko, (1/22/77).
Derwent Abs., 77060 A/43, Sumitomo, (9/16/78).
Derwent Abs., 19069 B/10, Sumitomo, J54012490.

Primary Examiner—Stanford M. Levin

[57] ABSTRACT

Improved enamels and insulated electrical articles produced therefrom are described. The enamels are composed of solutions of curable resin which have been modified to contain nylon polymer. This polymer facilitates application of the enamel to a metallic conductor so as to produce an especially smooth and desirable insulation coating.

4 Claims, 1 Drawing Figure

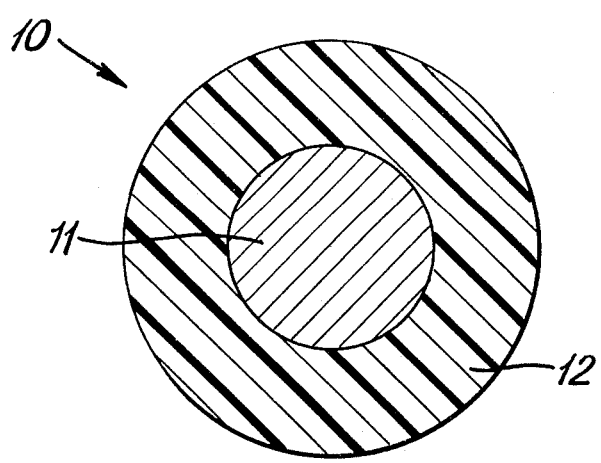

ns on electrical conductors.
ENAMEL HAVING IMPROVED COATABILITY AND INSULATED ELECTRICAL ARTICLES PRODUCED THEREFROM This is a continuation of application Ser. No. 183,857, filed Sept. 3, 1980, abandoned.

BACKGROUND OF THE INVENTION

Curable resins have long been used to insulate metallic conductors. Representative is their use as magnet wire enamels—see, for example, U.S. Pat. Nos. 2,936,296; U.S. 3,342,780; U.K. Patent 973,377; U.S. Pat. Nos. 3,426,098; and U.S. 3,668,175.

Such enamels most commonly comprise a solution of the resin in a solvent therefor. This solution may be applied to the conductor, dried and subjected to conventional curing conditions. This results in the production of a solid coating or wall of insulating resin peripherally about the conductor.

Myriad resins or combinations of resins have been employed in such enamels. Polyester resins, particularly ones produced through condensation of glycols and polyfunctional acids or anhydrides, have long been utilized in this manner. See, e.g., U.S. Pat. No. 2,936,296.

In U.S. Pat. No. 3,541,038, the production of high molecular weight polyimidamide resins by condensation of tribasic acid anhydride with diisocyanate compounds is described. The resultant resins are especially useful for coil-impregnation or electrical insulation. Tough films can also be produced from solutions of them.

More recently, polyetherimides comprising the reaction products of bis ether anhydrides with organic diamines have been suggested for use as wire coatings. They can be deposited on the conductor from simple solvents, U.S. Pat. No. 3,847,867; or as powders from fluidized beds, U.S. Pat. No. 4,098,800; or from reactive ether solvents, U.S. Pat. No. 4,115,341; or as reaction products prepared in the presence of a phenolic solvent, U.S. Pat. No. 4,024,010.

Polyisocyanate compounds, preferably employed in blocked form, are also described in U.S. patent application Ser. No. 53,317 where they are reacted to cross-link various polyetherimides. The resultant resins make highly preferred enamels for electrical insulation.

It is also known to upgrade the properties of such wire enamels by including minor proportions of other additives. For example, U.S. Pat. No. 3,668,175 confirms that the addition of titanate esters, phenolic resins, and the like, have exemplary effects on such important properties of wire enamels as flexibility, abrasion resistance, heat shock, cut-through temperature, and thermal life. This patent also discloses a general improvement in heat shock, at some expense to thermal life, when adding blocked polyisocyanates to enamels comprising polyester amide imides.

Notwithstanding the foregoing and other improvements in the properties of enamels, drawbacks respecting their application have remained. Most importantly, enamels applied from solvent solution commonly produce rough and grainy coatings. Such coating walls are inefficient as insulators and result in substantial scrap losses.

DESCRIPTION OF THE INVENTION

The present invention involves a means for producing smooth insulation surfaces on electrical conductors. This avoids the previously described drawbacks and is accomplished by improving the surface coatability of an enamel solution.

This improved coatability is obtained by incorporating nylon polymer within the enamel solution. An effective amount of the nylon enhances its surface coatability. This results in production of a smooth and non-grainy wall or coating of insulating resin on a treated conductor.

Enamel compositions susceptible to improvement in accordance with present invention include any of the well known and/or available resin solutions. These compositions may be quite simple and need comprise only a curable resin and a solvent therefore. Ordinarily, the resin is present in from 15 to 60% by weight of solvent.

As described above, many suitable resins are known and there is no criticality in their selection. Preferred, however, are the previously mentioned polyester, polyesterimide and/or polyetherimide resins, particularly ones cross-linked with polyfunctional isocyanate agent or the like.

The solvent likewise lacks criticality. Any solvent or mixture of solvents which will dissolve the particular resin utilized is satisfactory. Representative are such preferably organic solvents as cresylic acids, phenols and aprotic solvents and glycol ethers.

Any nylon—i.e., polyamide—may be utilized in accordance with the present invention. Representative are Dupont's Elvamid 8061.

While the amount of nylon incorporated into the enamel may vary greatly, it must be an amount sufficient to enhance surface coatability. The amount of nylon polymer and curable enamel resin are preferably in a weight ratio of from 2:25 to 0.5:25.

In addition to these essential ingredients, the present compositions may contain such common enamel additives as resin curing and/or cross-linking agents, etc. It may also contain conventional nylon adjuncts, including delustrants, such as titanium compounds.

BRIEF DESCRIPTION OF THE DRAWING

The FIGURE shows a cross-sectional view of an insulated conductor of the present invention.

DESCRIPTION OF PREFERRED EMBODIMENTS AND EXAMPLES

In the figure, a magnet wire 10, has a conductor 11 (normally metallic) covered peripherally with an insulating wall or layer 12 of curable resin admixed with nylon polymer. Although the figure illustrates a conductor wire which is circular in cross-section, it will be understood that square, rectangularly or other shaped conductors in, for example, the form of flat strips or foils may also be used without departing from the scope of this invention.

Wire test properties are carried out by standard tests. "Flexibility 25+" is done by elongating a specimen, winding it ten times around a mandrel and examining for adherence failure, and the values are expressed in units comprising mandrel diameters (Reference GE Method E18B4 and National Electrical Manufacturers Association (NEMA) Pub. No. MW1000 Part 3, Paragraph 2.1.1). Dissipation factor is done by immersing a bent section of coated wire in hot mercury and measuring at 60 to 1000 hertz by means of a General Radio Bridge, or its equivalent, connected to the speciman and the mercury. The values are expressed in units of % at the specified temperature in degrees Centigrade (Reference NEMA 9.1.1). Heat aging is carried out by placing a coil of unstretched unbent coated wire in an oven under the specified conditions and evaluating it after 21 hours. The values are expressed in mandrel diameters withstanding failure after 21 hours, at 175.C, and 0% stretch. Cut through temperature is done by positioning two lengths of wire at right angles, loading one with a weight and raising the temperature until thermoplastic flow causes an electrical short, and the values are expressed in units comprising degrees centrigrade at 2000 g. (Reference NEMA method 50.1.1). Dielectric strength is determined on twisted specimens to which are applied 60-hertz voltage until breakdown occurs. The breakdown voltage is measured with a meter calibrated in root-mean-square volts. The values are expressed in units comprising kilovolts (kv). (Reference NEMA Method 7.1.1)

EXAMPLE I

A flask equipped with a thermometer, $N_2$ purge, mixer, and packed column with Dean Stark trap, is charged with following:

| Material | Grams |
|---|---|
| Ethylene glycol | 214.0 |
| Terephthalic acid | 582.0 |
| Trimellitic anhydride | 574.0 |
| Methylene Dianiline | 298.0 |
| Tris-2-hydroxyethylisocyanurate | 820.0 |
| Tetra isopropyl titanate | 4.6 |
| Monethyl ether diethylene glycol | 442.0 |
| Nylon (Elvamide 8061 of duPont) | 91.0 |

The contents are heated to a maximum of 218° C. until the theoretical amount of water is obtained and the acid number reaches 0.51%. Then with cooling, 1350 grams of monethyl ether diethylene glycol and 442 grams of Solvesso 100 are added. To 1500 grams of the above, 52.68 grams of a blocked tri-functional isocyanurate (Mondur SH) and 21 grams of tetra isopropy titanate are added.

A metal wire is coated with the resultant enamel utilizing seven passes on a 15 foot gas-fired down-draft tower. The surface of the coated insulation is smooth. In contrast, wire coated in the same manner and utilizing the same enamel formula (except for the omission of the nylon) has a poor and grainy appearance.

EXAMPLE II

The process of Example I is repeated except the flask contents are heated to a maximum of 217° C. until the theoretical amount of water was obtained and the acid reaches 0.6%. Then, with cooling, 1200 grams of monoethyl ether diethylene glycol and 442 grams of Solvesso 100 are added. To 1500 grams of the above, 52.68 grams of a blocked isocyanurate (Mondur SH) and 21 grams of tetra isopropyl titanate are added.

After application as in Example I, the coated enamel has the following properties:

| Film smoothness | Smooth |
|---|---|
| Flexibility 25+ | 2X |
| Dissipation factor 220° C. | 4.9 |
| Heat aging, 21 hrs. 175° C.-0% | 1X |
| Cut through, °C. | 405 |
| Dielectric strength, kV | 9.5 |

EXAMPLE III

The process of Example II is repeated except 112 grams of 50% phenolic resin is added to the enamel immediately prior to application to the wire. After application, the coated enamel has the following properties:

| Film smoothness | Excellent |
|---|---|
| Flexibility 25+ | 1 |
| Dissipation factor 220° C. | 4.8 |
| Heat aging, 21 hrs., 175° C.-0% | 2X |
| Cut through, °C. | 400 |
| Dielectric strength, kV | 9.2 |

To more completely describes the present invention, the disclosures of the various applications and patents mentioned above are incorporated herein by reference. Obviously, many modifications and variations of the present invention are possible in the light of the above and other well-known teachings. It is therefore to be understood that changes may be made in the particularly described embodiments of this invention. All are within the full intended scope of the invention as defined in the appended claims.

I claim:

1. In an enamel composition consisting essentially of a curable polyesterimide resin dissolved in a solvent therefor, the improvement wherein said composition additionally contains an amount of nylon polymer sufficient to enhance surface coatability and smoothness.

2. The composition of claim 1, wherein the polymer and resin are in a weight ratio of from 2:25 to 0.5:25.

3. The composition of claim 1, wherein the resin is present in from 15 to 60% by weight of solvent.

4. The composition of claim 1, wherein said composition additionally contains poly-functional isocyanate cross-linking agent for the resin.

* * * * *